United States Patent [19]

Groover

[11] Patent Number: 5,080,145

[45] Date of Patent: Jan. 14, 1992

[54] WIRE FENCE MENDER AND METHOD

[76] Inventor: Gerald L. Groover, Box 377, Parrish, Fla. 34219

[21] Appl. No.: 624,558

[22] Filed: Dec. 10, 1990

[51] Int. Cl.$^5$ ................................................ B21F 9/02
[52] U.S. Cl. ................................... 140/118; 140/123.5
[58] Field of Search ............... 140/52, 117, 118, 123.5; 24/71.3

[56] References Cited

U.S. PATENT DOCUMENTS

| | | | |
|---|---|---|---|
| 805,666 | 11/1905 | Regenier et al. | 140/117 |
| 923,586 | 6/1909 | Schermerhorn | 140/118 |
| 1,058,376 | 4/1913 | Lawson | 140/52 |
| 1,574,857 | 3/1926 | Barneck | 24/71.3 |
| 1,855,960 | 4/1932 | Hansen | 140/117 |
| 2,124,416 | 7/1938 | Hadland | 140/123.5 |

*Primary Examiner*—Lowell A. Larson
*Attorney, Agent, or Firm*—Charles J. Prescott

[57] ABSTRACT

A wire fence mender and method is disclosed. The device includes a crank or Z-shaped member having spaced generally parallel end portions connected at either end of, and extending in either from, an elongated central portion. One end portion forms a handle while the other end portion forms a wire engaging and winding portion and includes a transverse aperture therethrough for receiving a length of fence wire. In operation, one segment of a broken fence wire is extended by splicing an extension thereto which is then passed through a loop formed in the end of the other broken wire segment. The distal end of the wire extension is then passed through the aperture and bendably locked therewithin, after which the device is first rotated in one direction about the first end portion while bearing against the looped tensioned broken segments. Without need of other tools or disengagement, the device is then used to bendably lock and maintain tension by slight rotation in the opposite direction and then to pivotally wind the distal portion of the wire extension around itself to lockably connect it to the loop completing the repair.

1 Claim, 2 Drawing Sheets

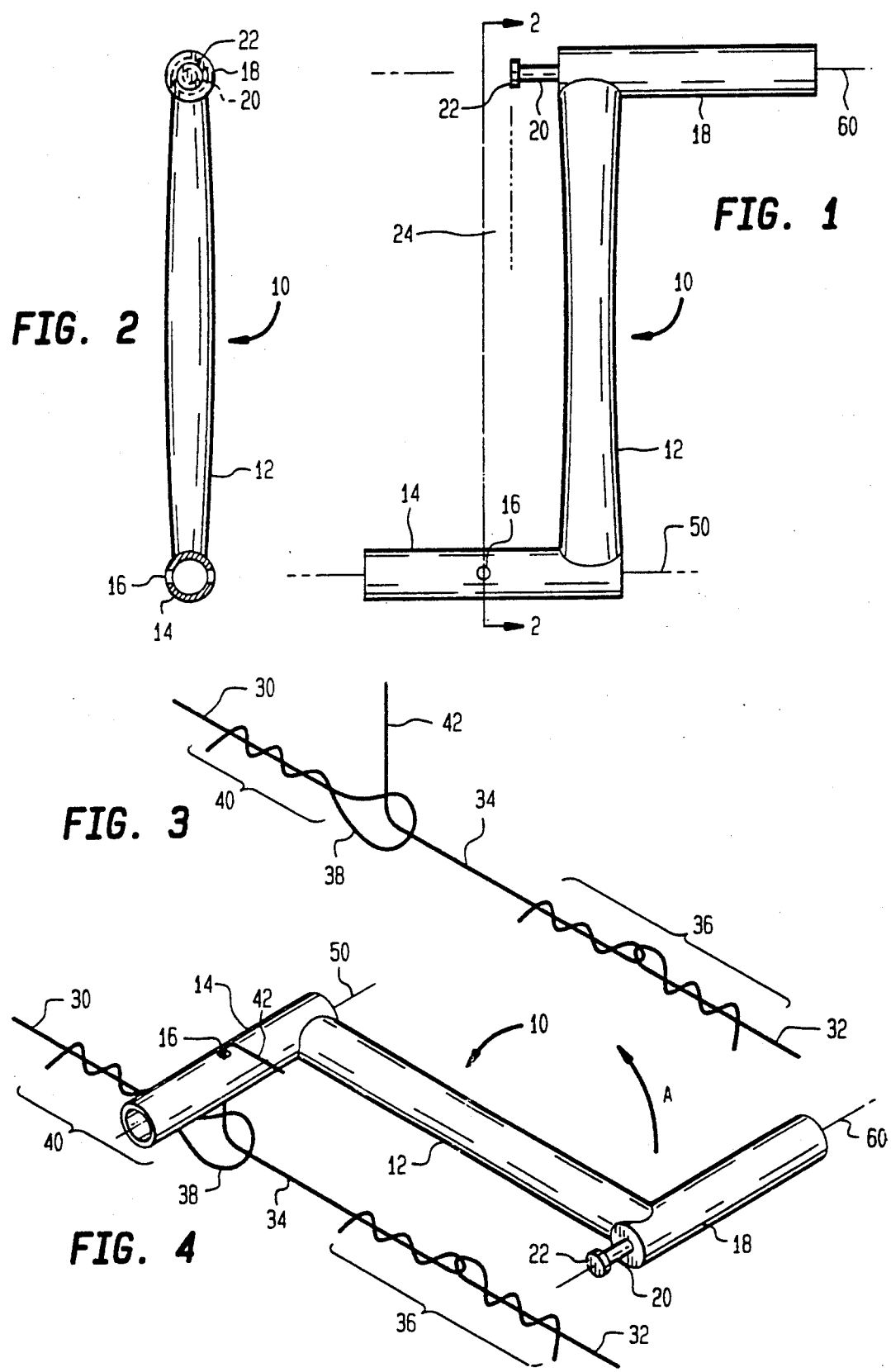

WIRE FENCE MENDER AND METHOD

BACKGROUND OF THE INVENTION

This invention relates generally to wire splicing tools, and more particularly to a device and method of repairing a broken single strand or barbed fence wire by a single user.

Repair of barbed and single strand wire fences is well known to those with farms and larger fenced areas for dividing property and containing animals. Typically, the repairman is without the availability of a source of electric power and such devices must thus be hand operable. Retensioning the broken wire segments of primary importance.

One means of accomplishing such a repair is through the use of a device called a "COME-A-LONG" which may be connected to each end of the broken wire or extension thereof and then used to stretched the broken wire segments back together, after which a splice is effected. However, such a method in all likelihood will not result in a fully tensioned wire repair. Additionally, such devices are cumbersome to handle.

Various other patented devices are also available for splicing, typing and wrapping wire as follows:

| | |
|---|---|
| Self | 3,805,854 |
| Perrien | 4,393,905 |
| Kandarian | 4,353,295 |
| Fenley | 4,830,065 |
| Cushman | 3,700,009 |
| Gulemi | 3,131,731 |
| Holman | 3,168,118 |
| Hunziker | 3,072,156 |

The present invention provides for an extremely simple, yet strong and extremely effective device for mending broken wire and barbed fences with a method of accomplishing same. The device is Z- or crank-shaped having a laterally extending handle from one end of a central member and a wire engaging member extending in the opposite direction from the other end of the central member. The wire engaging portion includes a transverse aperture through which the broken wire or extension thereof is passed after being engaged through a loop formed in the opposite broken wire. Rotation or cranking motion of the handle thereafter fully tensions the broken wire segments and then bendably locks it to secure the tension, allowing the same device without disengagement to then complete the splice or repair.

BRIEF SUMMARY OF THE INVENTION

This invention is directed to a wire fence mender and method. The device includes a crank or Z-shaped member having spaced generally parallel end portions connected at either end of, and extending in either from, an elongated central portion. One end portion forms a handle while the other end portion forms a wire engaging and winding portion and includes a transverse aperture therethrough for receiving a length of fence wire. In operation, one segment of a broken fence wire is extended by splicing an extension thereto which is then passed through a loop formed in the end of the other broken wire segment. The distal end of the wire extension is then passed through the aperture and bendably locked therewithin, after which the device is first rotated in one direction about the first end portion while bearing against the looped tensioned broken segments. Without need of other tools or disengagement, the device is then used to bendably lock and maintain tension by slight rotation in the opposite direction, and then to pivotally wind the distal portion of the wire extension around itself to lockably connect it to the loop completing the repair.

It is therefore an object of this invention to provide an extremely simple, economical and effective wire fence mender for repairing broken single strand and barbed wire fences.

It is another object of the invention to provide a device for mending broken fence wire so as to have the same high level of tensioning as before the brake.

It is yet another object of this invention to provide a method of repairing single strand and barbed wire fences.

In accordance with these and other objects which will become apparent hereinafter, the instant invention will now be described with reference to the accompanying drawings.

BRIEF DESCRIPTION OF THE DRAWINGS

FIG. 1 is a side elevation view of the invention.

FIG. 2 is an end elevation view of the invention in the direction of arrows 2—2 in FIG. 1.

FIG. 3 is a perspective view of a first step of the method.

FIG. 4 is a perspective view of a next step of the method.

DETAILED DESCRIPTION OF THE INVENTION

Figure 5:
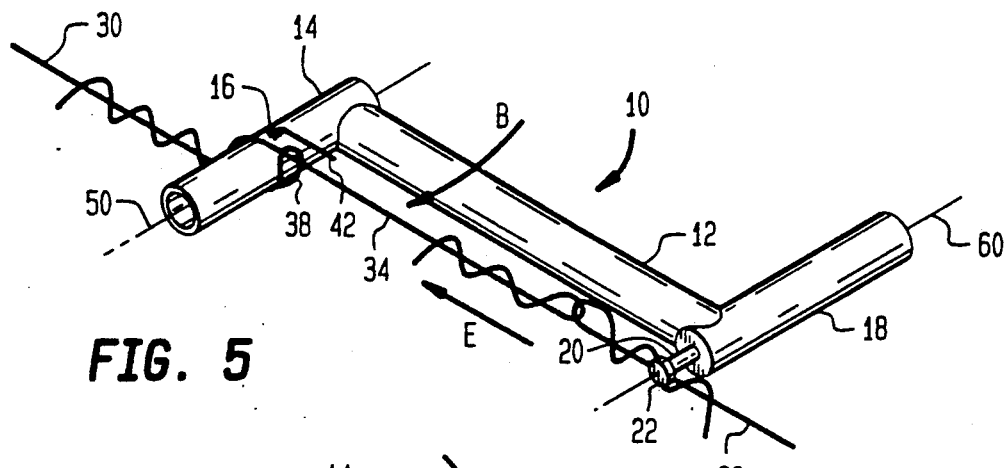
FIG. 5 is a perspective view of the holding feature of the invention.

Referring now to the drawings, and firstly to FIGS. 1 and 2, the wire fence mender is shown generally at numeral 10. The device 10 includes a central elongated rigid tubular member 12 having a handle portion 18 at one end also formed of rigid tubing extending orthogonally in one direction and a wire engaging steel tubular member 14 connected at the other end of central member 12 and extending orthogonally in the opposite direction from handle 18.

The wire engaging member 14 includes a transverse hole 16 therethrough which is sized to receive a length of wire passed therethrough. This hole 16 is positioned centrally along the length of wire engaging member 14 as shown in FIG. 1.

A shaft 20 having a head 22 at its distal end extends coaxially from one end of handle 18 in the same direction as wire engaging portion 14. This headed shaft 20 has its distal end spaced a distance 24 from the orthogonal projection of hole 16, which purpose will be described herebelow. In the preferred embodiment, handle 18 and wire engaging member 14 are parallel about axes 60 and 50, respectively.

Method of Use

Referring now to FIGS. 3 to 7, the method of use in sequential form of the present invention 10 for splicing the segmented or broken portions 30 and 32 of a length of fence wire or barbed wire is there depicted. The first step requires the splicing of an extension wire 34 to one of the fence wire segment 32 in the region shown generally at 36. This is required so as to extend the overall working length of that wire segment 32 so as to overlap wire segment 30.

Next, an eye 38 is formed at the distal end of fence wire segment 30 by winding the distal end portion thereof back on itself in the region 40.

Thereafter, the distal end 42 of wire extension 34 is fed through eye 38, passed through aperture 16 in the device 10, and then bent over against the outer wall surface of wire engaging member 14 so as to prevent removal of the wire extension 42 from aperture 16.

Referring additionally to FIG. 5, handle 18 is rotated about axis 50 in the direction of arrow A so as to draw wire extension 34 through loop 38 in the direction of arrow E.

At a point where the user has applied sufficient rotational torque about axis 50 through handle 18 to create an acceptable wire tension between wire segments 30 and 32, the headed shaft 20 which extends from the end of handle 18 may be utilized by moving central member 12 pivotally about the axis of aperture 16 in the direction of arrow B and then lockably engaging the head 22 about wire segment 32 so that shaft 20 presses thereagainst. The previous tensioning will maintain the arrangement as shown in FIG. 5 so that the user may examine the overall fence mending and tensioning to determine acceptability. Note that offset 24 previously described in FIG. 1 allows the user to crank tension into the wire segments without interference with headed shaft 20.

Figure 6:
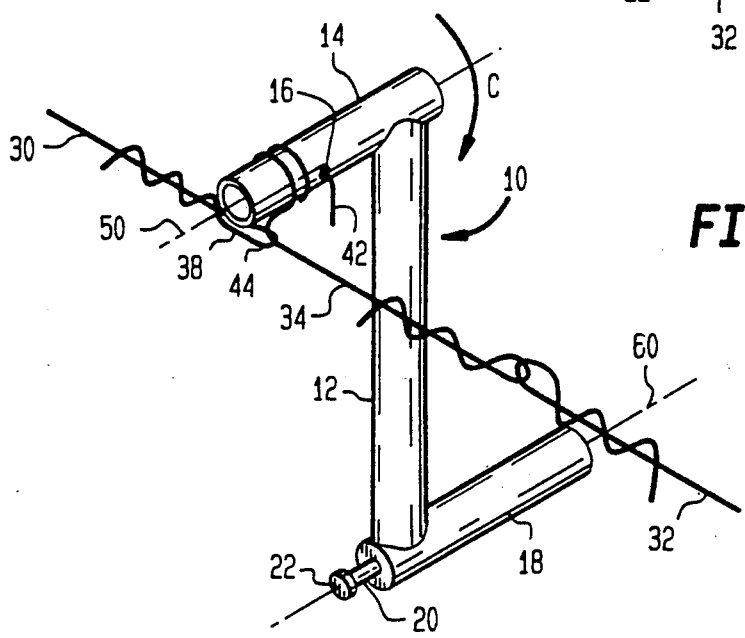
FIG. 6 is a perspective view of a next step of the method.

Thereafter, headed shaft 20 is released from engagement against wire segment 32 and the handle 10 is rotated oppositely in the direction of arrow C shown in FIG. 6 so as to bend or kink the wire extension 34 at 44 as it passes through loop 38. Having accomplished this wire kinking motion, no tensioning will thereafter be lost during the next splice winding stage shown in FIG. 7.

Figure 7:
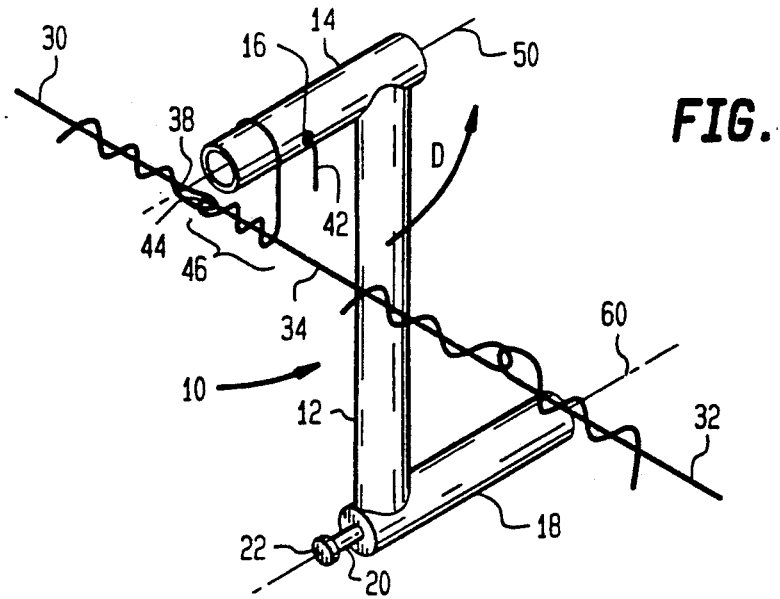
FIG. 7 is a perspective view of a final step of the method.

The entire device 10 is thereafter pivoted as shown in FIG. 7 in the direction of arrow D about the wire extension 34 so as to form a wound splice in the region of 46. The splicing then being completed, the remainder of the distal end 42 of extension 34 may be cut and removed.

Should the fence be fabricated of barbed wire, it is required that two or three of the barbs formed into wire extension 34 be removed so that sufficient wire will pass through aperture 16 and will also smoothly travel through loop 38 during the tensioning winding action shown in FIGS. 4 and 5.

The offset between axes 50 and 60 shown in FIG. 1 will determine the amount of mechanical advantage provided the user to tension the repaired wire segments. The preferred ratio or lever arm is approximately 9", the wire engaging shaft having a diameter of about 0.8" or a ratio of about 11:1.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A wire fence mender implement for splicing and tensioning two lengths of fence wire comprising:

a Z-shaped rigid thin-wall metallic tubular member having a straight, slender central portion, a first straight, slender end portion forming a wire engaging and winding member connected to and orthogonally extending in one direction from a first end of said central portion, and a second straight, slender end portion forming a handle connected to and orthogonally extending in the opposite direction from a second end of said central portion;

said first and second end portions parallel one to another and coplaner with said central portion;

an aperture formed transversely through said first end portion at a mid point along said first end portion sized to receive a length of fence wire therethrough;

said central portion having a length somewhat longer than said first and second end portions sufficient for tensioning between the two lengths of fence wire when said Z-shaped member is rotated by said handle in use;

a very slender cylindrical shaft connected to one end of, and coaxial with, said second portion extending in the same direction from said central portion as said first end portion;

said shaft substantially smaller in diameter than said first end portion and having an enlarged cylindrical head symmetrically with, and formed onto a distal end of said shaft;

said head of said shaft spaced from an imaginary line parallel to said central portion passing through said aperture and between said imaginary line and said central portion.

* * * * *